United States Patent
Stumpfig

[15] 3,661,125
[45] May 9, 1972

[54] METHOD AND APPARATUS FOR ADAPTING ENGINE TO STRATIFIED CHARGE OEPRATION

[72] Inventor: Friedrich Stumpfig, Bismarckstr. 31, Nurnberg, Germany

[22] Filed: Jan. 29, 1968

[21] Appl. No.: 701,290

[30] Foreign Application Priority Data

Jan. 27, 1967 Germany..................St 26424

[52] U.S. Cl. ................123/32 ST, 123/143 B, 123/191 SP
[51] Int. Cl.......................................................F02b 17/00
[58] Field of Search..................123/32, 32 ST, 32 SP, 32 E, 123/119, 143, 75 B

[56] References Cited

UNITED STATES PATENTS

| | | | |
|---|---|---|---|
| 2,893,360 | 7/1959 | Muller | 123/32 |
| 3,154,058 | 10/1964 | Warren | 123/32 |
| 978,969 | 12/1910 | Webber | 123/143 |
| 1,271,942 | 7/1918 | Ricardo | 123/143 B |
| 1,392,364 | 10/1921 | Smith | 123/143 B |
| 1,422,794 | 7/1922 | Smith | 123/143 B |
| 2,023,634 | 12/1935 | Boudet | 123/143 B |
| 2,032,986 | 3/1936 | Howell et al. | 123/143 B |
| 2,758,576 | 8/1956 | Schlamann | 123/32 ST |
| 3,066,661 | 12/1962 | May | 123/143 B |
| 3,066,662 | 12/1962 | May et al. | 123/143 B |
| 3,361,353 | 1/1968 | Millman | 123/32 E |

*Primary Examiner*—Laurence M. Goodridge
*Attorney*—Robert H. Jacob

[57] ABSTRACT

Method and apparatus for operating a two-cycle or four-cycle externally excited combustion engine with external ignition means where at least the fuel required for the ignition is introduced without admixture of main air into an evaporating chamber open toward the combustion chamber where it is precipitated against a non-water cooled wall that is hot during operation and which is elongated and encompasses the vaporizing chamber, is vaporized and is pushed to the ignition point in the vaporizing chamber together with some air until ignition takes place and where immediately after the ignition burning mixture is blown out of the vaporizing chamber into the combustion chamber, where the introduction of the fuel into the vaporizing chamber begins preferably at the end or shortly after the power stroke, after which during the compression stroke compressed air or compressed air-fuel mixture is pushed out of the combustion chamber into the vaporizing chamber, is mixed therein with vaporized fuel and the mixture is pushed to the ignition point provided in the vaporizing chamber, while simultaneously the burned out fuel gas in the vaporizing chamber is moved into a closed end of the vaporizing chamber and is compressed there, whereupon after the ignition burning mixture is blown away from the ignition point in the form of a bunched, very rapid stream of flames through the vaporizing chamber and, subsequently, the last parts of the burning mixture are displaced in the vaporizing chamber toward the combustion chamber by the burned out fuel gas.

8 Claims, 5 Drawing Figures

PATENTED MAY 9 1972　　3,661,125

Inventor:
FRIEDRICH STÜMPFIG

BY Robert K. Jacob
AGT.

ized chamber

3,661,125

METHOD AND APPARATUS FOR ADAPTING ENGINE TO STRATIFIED CHARGE OEPRATION

BACKGROUND OF THE INVENTION

The invention concerns a method of operation for a four-cycle or two-cycle internal combustion engine having external ignition exciter means, having an evaporating chamber as a part of the combustion chamber, or of the entire compression space where at least the fuel required for ignition or the entire fuel is introduced into the vaporizing chamber, is precipitated therein on a wall which is not cooled by water, is evaporated and until ignition is pushed together with some air to the ignition point or station in the vaporizing chamber, and where immediately after ignition burning mixture is blown in the form of a flame stream over the precipitation location of the fuel into the other part of the combustion space.

Known machines of this type can work with excess air due to the stratification of the mixture obtained and because of the fuel evaporation, while idling as well as also with a partial load. For that reason, they distinguish themselves in this field alone by low fuel consumption and small contents of poison in the waste gases. However, they have the shortcoming that the vaporizing of the fuel is still too slow for operating with high speeds of rotation and large fuel introduction and that, besides, a particularly formed cylinder head or piston, or both, are required.

SUMMARY OF THE INVENTION

In accordance with the present invention, these shortcomings are eliminated in that in operation diffused fuel is precipitated and evaporated in an elongated vaporizing chamber upon a wall which encompasses it, while the introduction of the fuel into the vaporizing chamber takes place, preferably somewhat before or approximately at the end of the fuel gas expansion in the cylinder space, then during the compression stroke mainly compressed air or compressed fuel-air mixture is forced out of the combustion chamber of the engine into the vaporizing chamber, is mixed therein with vaporized fuel and the mixture is pushed to the ignition station provided in the vaporizing chamber, while simultaneously the burned out fuel gas contained in the vaporizing chamber is moved into a closed end of the vaporizing chamber and compressed there, whereupon after the ignition burning mixture is blown away from the ignition area in the form of a bunched, very rapid flame stream through the vaporizing chamber into the combustion chamber and, subsequently, the last parts of the burning mixture in the vaporizing chamber are displaced by the said burnt-out fuel gas into the combustion chamber.

The initial starting of an engine in accordance with the invention may also take place while the wall of the vaporizing chamber is cold because prior to the ignition no rapid stream flows arise as yet in the vaporizing chamber, and therefore an essential part of the fuel introduced in the vaporizing chamber is not precipitated but is initially ignited and burned while in the form of droplets. However, the starting of the machine may also be effected with Diesel oil by means of a simple electrically heated glowing coil.

The elongated shape of the vaporizing chamber and of the wall around it make possible, even with a small vaporizing chamber, the dispersed precipitation and evaporation of the fuel upon a relatively large vaporizing surface. Besides, due to the elongated vaporizing chamber and the wall encompassing the same, blowing of the flame stream through the vaporizing chamber is speeded up, so that the flame stream very rapidly vaporizes remainders of precipitated fuel that are still in the vaporizing chamber, the wall of the vaporizing chamber is continually heated during operation, and produces strong whirling action in the combustion chamber of the engine. All of these phenomena together cause a very rapid occurrence of the individual combustions, for which reason the fuel can be introduced into the vaporizing chamber earlier than with known engines without the danger of self-ignition and thereby the vaporizing time can be prolonged. The method of operation described accomplishes that also with very high numbers of rotation or speed and heavy fuel feeding a reliably ignitable mixture can be formed at the ignition point and that the fuel introduced is completely burned during the power stroke, which further reduces the fuel consumption and the contents of poison in the waste gases, while it increases the torque and the engine output.

If only pure air is fed into the cylinder space and is compressed in the combustion chamber of the machine, while the entire fuel is fed into the vaporizing chamber and is rapidly and completely vaporized therein by means of the operating method, there still arise the essential advantages that also the escaping of hydrocarbons out of the cylinder space into the crankcase and the consequent poisoning of the air are extensively prevented, furthermore the fuel loss during the cylinder rinsing of a two-cycle engine is avoided, and finally, that in some countries, particularly cheap, hardly ignitable Diesel oils can be utilized in a light, cheap and very efficient two-cycle or four-cycle engine.

It is particularly important with the method of operation that the elongated vaporizing chamber with its enclosing wall can be rather small and, therefore, there exists the possibility of arranging it with the required components for the fuel introduction and for the ignition in or on a housing which can be threadedly mounted on the internal combustion engine in lieu of a conventional spark plug. In this manner, any conventional four-cycle or two-cycle internal combustion engine can be adapted at very little cost and with little time consumption for the method of operation in accordance with the invention, without any change in the cylinder head or the piston, which also means without change in the construction of the internal combustion engine.

A decrease of the compression factor in the combustion chamber of a conventional internal combustion engine for the automobile traffic is also avoided by the arrangement of the vaporizing chamber outside of the combustion space of the engine, because here the elongated vaporizing chamber need not be great, furthermore because the fuel vaporization prior to the ignition increases the compression, and finally because during the vaporizing of the entire fuel in the vaporizing chamber pure air can be introduced without pre-heating and without essential choking in the space of the cylinder.

BRIEF DESCRIPTION OF THE DRAWINGS

The use of the method of operating with an elongated evaporation chamber arranged outside the combustion chamber of the machine is particularly simple and advantageous and it is explained hereinafter in connection with several suitable embodiments illustrated in the drawings in which.

DESCRIPTION OF THE PREFERRED EMBODIMENTS

Figure 1:
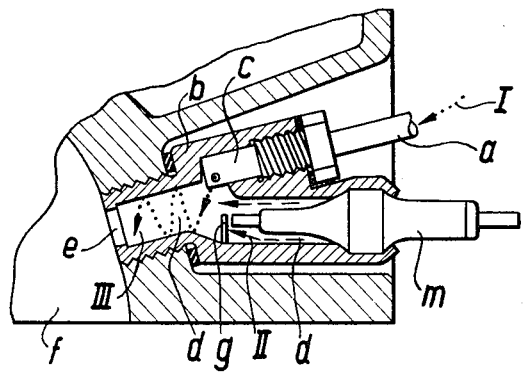
FIG. 1 is a longitudinal section through a part of a cylinder head with a threadedly inserted device for injecting vaporizing and igniting the fuel, FIGS. 2, 3 and 4 each show a longitudinal section of a device adapted to be threadedly received in a cylinder head for blowing in, vaporizing and igniting the fuel.

In the embodiment of the invention illustrated in FIG. 1, at least the fuel required for the ignition or the entire fuel is supplied intermittently by means of a high pressure pump in the direction of the arrow I through the conduit $a$ to the high pressure injection nozzle $c$ arranged in the casing $b$ and thereby tangentially into the elongated vaporization chamber $d$ which may, for example, be cylindrically shaped. The injecting of the fuel may be started already somewhat before or briefly after the termination of the work stroke. At that time there still flows burned out gas, out of the right-hand end of the vaporizing chamber $d$ i.e. gas that is no longer burning, in the direction of the arrow II through the vaporizing chamber $d$ and its outlet $e$ into the combustion chamber $f$ of the engine. During this rinsing of the vaporizing chamber the fuel injected tangentially into the vaporizing chamber moves therein in the direction of arrow III circulating to the outlet $e$ of the vaporizing chamber and is thereby distributed and dispersed over the length and circumference of the wall of the vaporizing chamber which is hot when in operation. For that reason, and because the dispersed precipitation of the fuel takes place relatively long before the ignition, furthermore because the wall of the oblong vaporizing chamber defines a particularly large vaporizing surface, and finally because during the compression stroke the air out of the combustion chamber $f$ previously introduced into the cylinder space with or without fuel is pressed into the vaporizing space $d$, and because of the fact that the fuel vapor upon the wall of the vaporizing chamber is pushed with some air to the ignition point $g$, there develops also with a very high number of rotation of the engine and with large fuel injection a mixture which is always reliably combustible, which after the ignition at the ignition point $g$ is blown out as a bunched stream of fire or flames at very great velocity through the vaporizing chamber $d$ into the combustion chamber $f$, thus rapidly vaporizing any deposited fuel rests in the vaporizing chamber, and carrying them along into the combustion chamber $f$ containing air or a fuel air mixture, and where then the further combustion takes place rapidly and completely under the effect of considerable whirling. Due to the rapid fuel vaporization and the rinsing of the vaporizing chamber, as well as due to the strong whirling effect produced in the combustion chamber, each combustion takes place so rapidly, that any self-igniting of the fuel to be introduced into the vaporizing chamber $d$ can take place still less than with a conventional two-cycle engine in which mixture rinsing of the cylinder takes place. Since this manner of operation has the characteristics of the spraying method already explained, it also possesses its advantages.

Figure 2:
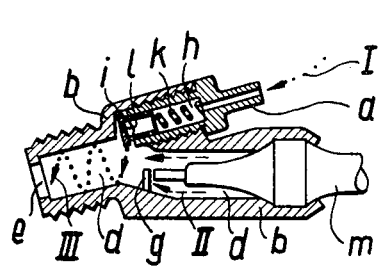
Figure 5:
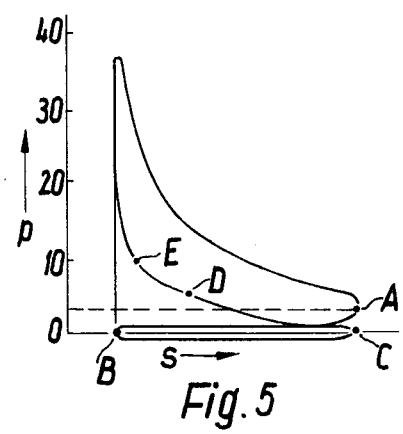
FIG. 5 is an example for the cutting-in of the operating method in the compression cycle of a four-cycle engine.

In order to avoid the use of an expensive high pressure pump for the introduction of the fuel, it is also possible to threadedly insert the device in accordance with FIG. 2 into the cylinder head of an engine in lieu of a spark plug. Here, the fuel required for the ignition or the entire fuel is fed by means of a low pressure pump, for example, a tank fuel pump coupled to the engine that is present in most motor vehicles, either at intervals or continually in the direction of the arrow I, through the conduit $a$ into the cylindrical valve chamber $h$ arranged in the housing $b$. Between the latter and the elongated vaporizing chamber $d$ the valve $i$ is arranged which for its guidance has a collar that loosely extends into the valve chamber $h$ and which is raised somewhat from the valve seat by the pressure spring $k$ biased against it, at the left end of the valve chamber $h$ as shown in FIG. 2. In this position the valve chamber $h$ is in communication with the vaporizing chamber $d$ through the narrow collar slot 1. The width of the collar slot 1 and the strength of the spring are so proportioned that the valve $i$ still remains open when there is small excess pressure in the cylinder chamber, in the combustion chamber, and in the vaporizing chamber $d$, and is closed if heavy pressure exists in the said chambers. Therefore, in a four-cycle engine where the course of pressure in the cylinder space is as illustrated in FIG. 5, compressed air or compressed fuel air mixture is pushed from the beginning of the compression C until the pressure D is reached out of the cylinder space and the combustion space through the outlet $e$ into the vaporizing chamber $d$, and a part thereof through the collar slot 1 into the valve space $h$ containing the fuel supplied, and simultaneously and subsequently the burned out combustion gas present in the vaporizing chamber is displaced in the direction opposite to arrow II toward the right into the closed end of the vaporizing chamber. During the further and stronger increase in pressure from D to E arising in the cylinder space, in the combustion chamber, as well as in the vaporizing chamber, the valve $i$ closes suddenly against the effect of the spring and remains closed from the ignition point E until the pressure is reduced to A, i.e. approximately before termination of the expansion of the fuel gas in the cylinder space. Then the valve $i$ is again opened by the pressure of the charge previously forced from the vaporizing chamber into the valve chamber $h$, as well as by the pressure of the spring so that now with the valve $i$ open, the valve space charge which is somewhat compressed, as well as the fuel introduced through the conduit $a$ into the valve chamber during the course of the compression A to B and C will blow out through the collar slot 1 tangentially into the combustion chamber $d$. Since at the same time burned out combustion gas still flows from the right end of the vaporizing chamber $d$ in the direction of the arrow II through the vaporizing chamber and its outlet $e$ into the combustion space of the engine, and thus rinses the vaporizing chamber, also the load blowing out of the valve chamber $h$ moves tangentially into the vaporizing chamber $d$ circulating together with the added fuel in the direction of arrow III to the outlet $E$ of the vaporizing chamber. In this connection, the fuel is also deposited and vaporized on the wall of the vaporizing chamber which is hot during operation so that now with each subsequent compression stroke air or a fuel air mixture, as well as some fuel vapor are forced through the collar slot 1 into the valve chamber $h$ containing supply fuel and simultaneously the main part of the fuel vaporized in the vaporizing chamber is pushed together with compressed air or compressed fuel mixture to the ignition point $g$, the fuel is ignited there and thereupon burning mixture is blown as a flame stream through the vaporizing chamber $d$ and its outlet $e$ into the combustion chamber and the cylinder space of the engine where the further combustion takes place rapidly and completely aided by heavy whirling. Because the fuel to be vaporized is precipitated on the wall of the vaporizing chamber and is there first stored, no fuel vapor can reach the combustion chamber and the exhaust duct during the exhaust stroke. Only during the suction stroke transfer of fuel vapor from the vaporizing chamber to the combustion chamber is possible, and with particularly high engine speed and large fuel introduction it is even desired in order to avoid a mixture which is too rich in the vaporizing chamber. Since the embodiment in accordance with FIG. 2 also incorporates the features of the method of operation, it also possesses its advantages.

Figure 3:
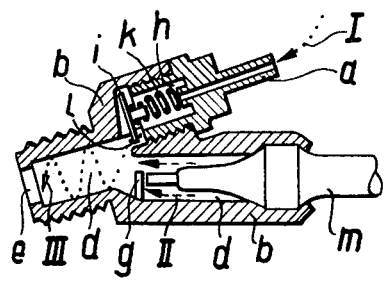
Figure 4:
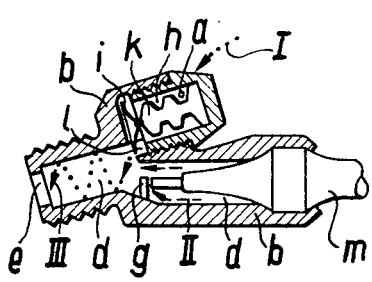

Also the embodiments in accordance with FIGS. 3 and 4 operate in the same manner as the embodiment in accordance with FIG. 2, where the fuel is likewise fed under low pressure through the duct $a$ into the valve chamber $h$ and from there spasmodically or interruptedly into the elongated vaporizing chamber $d$. The valves $i$ here which do not have a collar move during opening and closing in a cylindrical space, to which the channel 1 is connected which merges tangentially with the vaporizing chamber $d$, so that the fuel which is blown from the valve chamber $h$ into vaporizing chamber $d$ is moved therein likewise in the direction of arrow III circulating to the outlet $e$ of the vaporizing chamber $d$ and is thereby precipitated on its wall in dispersed condition. Subsequently, the same occurrences take place as in the embodiment in accordance with FIG. 2. In lieu of the helical spring $k$, it is also possible to utilize elastic corrugated tube spring $k$ which has a very thin wall as shown in FIG. 4, and whose hollow space is sealed with respect to the outside so that here the closing of the valve $i$ takes place through the gas pressure that is effective on the valve from the vaporizing chamber $d$ and through the gas pressure acting on the hollow spring space through the valve chamber $h$, so that the increase in pressure in the valve chamber $h$ does not become excessively large even at low engine speed or RPM. In this embodiment the fuel induction into the valve chamber $h$ takes place in the direction of the arrow I through the duct $a$ that merges laterally into the valve chamber.

The embodiments in accordance with FIGS. 2, 3 and 4 may all be produced economically while they require in addition merely a valve that is as simple as the valve for an automobile inner tube, and the costs of which are very insignificant as compared to the advantages gained. Operating of the valves in the manner described is insured in that the valves can be small and light, they have only a small stroke, are cooled by the fuel that is being supplied, and a considerable length of time is available for their opening, as well as for the injecting, for precipitating and vaporizing the fuel in the vaporizing chamber, and timely closing of the valves is effected by the high increase in pressure in the vaporizing chamber before the ignition point.

The structural configuration for the application for the method of operating may, of course, be differently formed. For example, the spark plug insulator $m$ may be thickened proximate the ignition location $g$ so that the gas flow toward the rear portion of the vaporizing chamber $d$ is choked more during high speed engine operation than with a lower number of rotations and, therefore, the increase in pressure in the valve space $h$ always remains approximately the same. When using the embodiment in accordance with FIG. 2, a pull spring may also be used in lieu of the compression spring $k$, which pull spring always closes the valve $i$ toward the right against the valve seat until the pressure in the vaporizing chamber $d$ has decreased to about 2 atm., and now the valve $i$ is opened by the pressure of the fuel continuously supplied in the direction of the arrow I at somewhat more than 2 atm. into the valve chamber $h$, as well as by the cooperation of an air or gas cushion forming in the valve chamber $h$ and the fuel is injected or blown out through an aperture tangentially into the vaporizing chamber $d$ where it moves on in a circulating manner in the direction of the arrow III as in the embodiment of FIG. 1, and is thus deposited. It is also possible to replace the valve chambers and valves illustrated in the drawings by an electromagnetically controlled valve and permit the entrance of the fuel to be vaporized through this valve into the vaporizing chamber, for example by suction. In lieu of the valve chamber $h$ arranged laterally of the vaporizing chamber $d$, a valve chamber may be used in the housing $h$ arranged in annular fashion about the vaporizing chamber and then an elastic spring disk of thin, solid walled sheet metal may be used as a valve and as a valve spring in such a manner that the fuel is also deposited in dispersed condition in the vaporizing chamber without any circulating movement. With particularly large cylinder sizes, it is recommended to provide additionally an elongated vaporizing chamber in the combustion space of the engine which is encompassed by a wall so that a device of the type described threadedly mounted in the cylinder head merges tangentially with the additional vaporizing chamber. For this purpose, each end of this vaporizing chamber may have an aperture and each aperture may be at the same distance from the tangential orifice.

If the entire fuel is always to be vaporized in the vaporizing chamber and air is only fed into the cylinder space, the fuel conduit $a$ must have built in it a simple device that controls the fuel flow, for example, a movable, conical valve needle. In this manner, the conventional carburetor and air pre-heating are eliminated. It is less advantageous, but fundamentally possible, to introduce only the fuel required for the ignition in quantities that are always the same into the vaporizing chamber and to introduce the varying quantities of fuel, that are required for obtaining the engine output or power differently in a manner known per se, directly into the combustion chamber and into the cylinder space. In this connection the fuel quantity mentioned last can be directed against a wall surface of the combustion space over which the flame stream flowing out of the vaporizing chamber sweeps and thus also the fuel quantity is vaporized.

Having now described my invention with reference to the embodiments illustrated, what I desire to protect by letters patent of the United States is set forth in the appended claims.

What is claimed is:

1. Method of operating an internal combustion engine having external ignition exciter means where at least the fuel required for ignition is introduced without admixture with the main air of combustion into a vaporizing chamber that communicates with the combustion chamber of the engine, is deposited on a wall in the vaporizing chamber which is not cooled and is hot during operation, is vaporized and directed together with air for combustion to the ignition electrodes in the vaporizing chamber and where immediately after ignition burning mixture propagates out of the vaporizing chamber into the combustion chamber, said method comprising the steps of introducing the fuel proximate the end of the power stroke of the engine, precipitating fuel in dispersed condition upon the wall encompassing an elongated vaporizing chamber, vaporizing the fuel in the vaporizing chamber, then during the compression stroke forcing compressed air or compressed fuel-air mixture out of the combustion space into the vaporizing chamber, admixing vaporized fuel and discharging the mixture toward the ignition point disposed generally centrally of the elongated vaporizing chamber, simultaneously moving and compressing the burnt-out fuel gas in the vaporizing chamber into a closed end of the vaporizing chamber, igniting the mixture at the ignition point and upon ignition propagating burning mixture in the form of bunched streams of flames from the ignition point through the vaporizing chamber into the combustion space and, subsequently, displacing the last parts of the burning mixture in the vaporizing chamber through the said burnt-out fuel gas into the combustion space.

2. Method of operating in accordance with claim 1 where the fuel to be vaporized is precipitated in dispersed condition over the length and circumference of a wall encompassing the vaporizing chamber where it is moved along a circular path.

3. Method in accordance with claim 2 where the fuel to be vaporized is introduced into the vaporizing chamber through a fuel disposed proximate the vaporizing chamber.

4. Method in accordance with claim 3 where the fuel to be introduced into the vaporizing chamber is first supplied into a valve chamber by way of a short stroke valve, said valve being closed under the pressure of each compression stroke, thereby closing said valve prior to the point of ignition time, keeping said valve closed during the power stroke and only reopening said valve by biasing means after the decrease of pressure in the combustion chamber and in the vaporizing chamber, while forcing some air prior to the closing of said valve out of the vaporizing chamber into the valve chamber and retaining the same therein as a compressed charge until the following opening of the valve, returning the charge tangentially into the vaporizing chamber, while carrying along the fuel introduced into the valve chamber into the vaporizing chamber and precipitating it therein in dispersed condition.

5. Method of operating in accordance with claim 4 where the valve is opened upon reduction of the pressure in the vaporizing chamber to approximately 2 atm. and re-closed until the time of ignition.

6. Method of operating in accordance with claim 4, where the fuel required for the power is introduced primarily with main air into the combustion chamber of the engine.

7. Method in accordance with claim 6, where the fuel introduced in the combustion chamber is precipitated in dispersed condition upon a heated wall portion and burning mixture blowing out of the vaporizing chamber is conducted as a stream of fire over the area of precipitation.

8. Method in accordance with claim 1, where combustion air is introduced in the engine in a known manner substantially without choking, where under heavy loads the introduction and depositing of the fuel starts essentially during or immediately after the exhaust stroke, and where during idling the fuel required for forming a favorable combustion mixture in the vaporizing chamber is introduced proximate the beginning of the compression stroke.

* * * * *